(12) United States Patent
Speller et al.

(10) Patent No.: US 11,731,779 B2
(45) Date of Patent: Aug. 22, 2023

(54) DRIVETRAIN FOR AN AIRCRAFT INCLUDING GEARBOX WITH COAXIAL INPUT AND OUTPUT SHAFTS

(71) Applicant: Textron Innovations Inc., Providence, RI (US)

(72) Inventors: Charles Hubert Speller, Flower Mound, TX (US); Cody Anderson, Lantana, TX (US)

(73) Assignee: Textron Innovations Inc., Providence, RI (US)

( * ) Notice: Subject to any disclaimer, the term of this patent is extended or adjusted under 35 U.S.C. 154(b) by 242 days.

(21) Appl. No.: 16/889,458

(22) Filed: Jun. 1, 2020

(65) Prior Publication Data
US 2021/0371120 A1   Dec. 2, 2021

(51) Int. Cl.
| | | |
|---|---|---|
| *B64D 35/08* | (2006.01) | |
| *B64C 29/00* | (2006.01) | |
| *B64D 27/24* | (2006.01) | |
| *F16D 41/069* | (2006.01) | |
| *F16H 1/28* | (2006.01) | |

(52) U.S. Cl.
CPC .......... *B64D 35/08* (2013.01); *B64C 29/0033* (2013.01); *B64D 27/24* (2013.01); *F16D 41/069* (2013.01); *F16H 1/28* (2013.01); *F16D 2300/06* (2013.01)

(58) Field of Classification Search
CPC .... B64D 27/24; B64D 35/08; B64C 29/0033; F16D 41/069; F16D 2300/06; F16H 1/28
USPC ........................................................ 244/7 A
See application file for complete search history.

(56) References Cited

U.S. PATENT DOCUMENTS

| | | | |
|---|---|---|---|
| 2,984,306 A | 5/1961 | Kottsieper | |
| 3,686,978 A | 8/1972 | Knoblach et al. | |
| 4,040,312 A | 8/1977 | Tappan et al. | |
| 5,281,094 A * | 1/1994 | McCarty | B64C 11/44 318/722 |
| 6,401,893 B1 * | 6/2002 | Kinoshita | F16D 41/07 192/113.32 |
| 9,834,303 B2 | 12/2017 | Bockmiller et al. | |
| 2006/0264296 A1 * | 11/2006 | Moeller | F16H 3/728 475/275 |
| 2008/0300083 A1 | 12/2008 | Max et al. | |
| 2009/0022608 A1 | 1/2009 | Rogner | |

(Continued)

FOREIGN PATENT DOCUMENTS

| | | |
|---|---|---|
| CA | 699150 A | 12/1964 |
| CA | 2350495 A1 | 4/2001 |

(Continued)

OTHER PUBLICATIONS

Speller, Charles Hubert, et al.; "Sealed Coaxial Input and Output Shafts"; U.S. Appl. No. 16/915,602, filed Jun. 29, 2020; 40 pages.

*Primary Examiner* — Brady W Frazier
(74) *Attorney, Agent, or Firm* — Bradley Arant Boult Cummings

(57) ABSTRACT

A rotorcraft includes a plurality of fan assemblies. Each fan assembly of the plurality of fan assemblies includes a drivetrain having a gearbox with an input shaft and a mast coaxially aligned with the input shaft, and a plurality of electric motors coupled to the input shaft. Each electric motor of the plurality of electric motors is coupled to the input shaft via a sprag clutch.

20 Claims, 5 Drawing Sheets

(56) References Cited

U.S. PATENT DOCUMENTS

| | | | |
|---|---|---|---|
| 2010/0127119 A1 | 5/2010 | Waide et al. | |
| 2011/0024555 A1* | 2/2011 | Kuhn, Jr. | B64C 29/0033 |
| | | | 244/17.11 |
| 2012/0234968 A1* | 9/2012 | Smith | B64D 17/64 |
| | | | 244/12.3 |
| 2012/0282103 A1* | 11/2012 | Muren | B64C 27/68 |
| | | | 416/205 |
| 2017/0217600 A1* | 8/2017 | Regev | B64D 35/02 |
| 2017/0274992 A1* | 9/2017 | Chretien | H02K 16/00 |
| 2019/0023410 A1 | 1/2019 | Speller | |
| 2019/0154126 A1 | 5/2019 | Cheng | |
| 2019/0193835 A1* | 6/2019 | Sandberg | B64C 11/34 |
| 2019/0322382 A1* | 10/2019 | Mackin | B64D 35/08 |
| 2020/0124150 A1* | 4/2020 | Veilleux, Jr. | F16H 57/02 |

FOREIGN PATENT DOCUMENTS

| | | |
|---|---|---|
| CA | 3101225 A1 | 1/2020 |
| CN | 104235329 A | 12/2014 |
| CN | 104882998 A | 9/2015 |
| CN | 109812551 A | 5/2019 |
| EP | 3333073 A1 | 6/2018 |
| WO | WO-0125653 A1 | 4/2001 |

* cited by examiner

DRIVETRAIN FOR AN AIRCRAFT INCLUDING GEARBOX WITH COAXIAL INPUT AND OUTPUT SHAFTS

TECHNICAL FIELD

The present disclosure relates generally to rotor-driven aircraft and more particularly, but not by way of limitation, to a gearbox design having coaxial input and output shafts.

BACKGROUND

This section provides background information to facilitate a better understanding of the various aspects of the disclosure. It should be understood that the statements in this section of this document are to be read in this light, and not as admissions of prior art.

Rapid commercial growth and expansion of urban areas often increases the distance from one side of a metropolitan area to another. This rapid commercial growth and expansion often results in an increase in the population, further resulting in more congestion and emissions due to an increased number of vehicles on the current highway infrastructure. As technology further increases, such metropolitan areas will continue to grow, placing serious burden on the current highway infrastructure to handle the increased traffic and furthering the need for improved travel across a metropolitan area that reduces emissions while allowing faster, more convenient, and more efficient travel throughout a metropolitan area and/or between bordering states. One approach is to utilize tiltrotor aircraft to carry people across metropolitan areas. Tiltrotor aircraft are configured to fly in helicopter mode for vertical takeoff and landing (VTOL) and in airplane mode for high-speed flight. These aircraft are preferably compact and light-weight vehicles. Minimizing the size and weight of tiltrotor aircraft and their components can be challenging.

SUMMARY

This summary is provided to introduce a selection of concepts that are further described below in the detailed description. This summary is not intended to identify key or essential features of the claimed subject matter, nor is it to be used as an aid in limiting the scope of the claimed subject matter.

An example of a drivetrain for an aircraft includes an input shaft, a first electric motor coupled to the input shaft via a first sprag clutch, a planetary gear set coupled to the input shaft, and a mast coupled to the planetary gear set. The input shaft and mast are coaxially aligned.

An example of a rotorcraft includes a plurality of fan assemblies. Each fan assembly of the plurality of fan assemblies includes a drivetrain having a gearbox with an input shaft and a mast coaxially aligned with the input shaft, and a plurality of electric motors coupled to the input shaft. Each electric motor of the plurality of electric motors is coupled to the input shaft via a sprag clutch.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Various aspects will now be described more fully with reference to the accompanying drawings. The disclosure may, however, be embodied in many different forms and should not be construed as limited to the aspects set forth herein.

Figure 1:
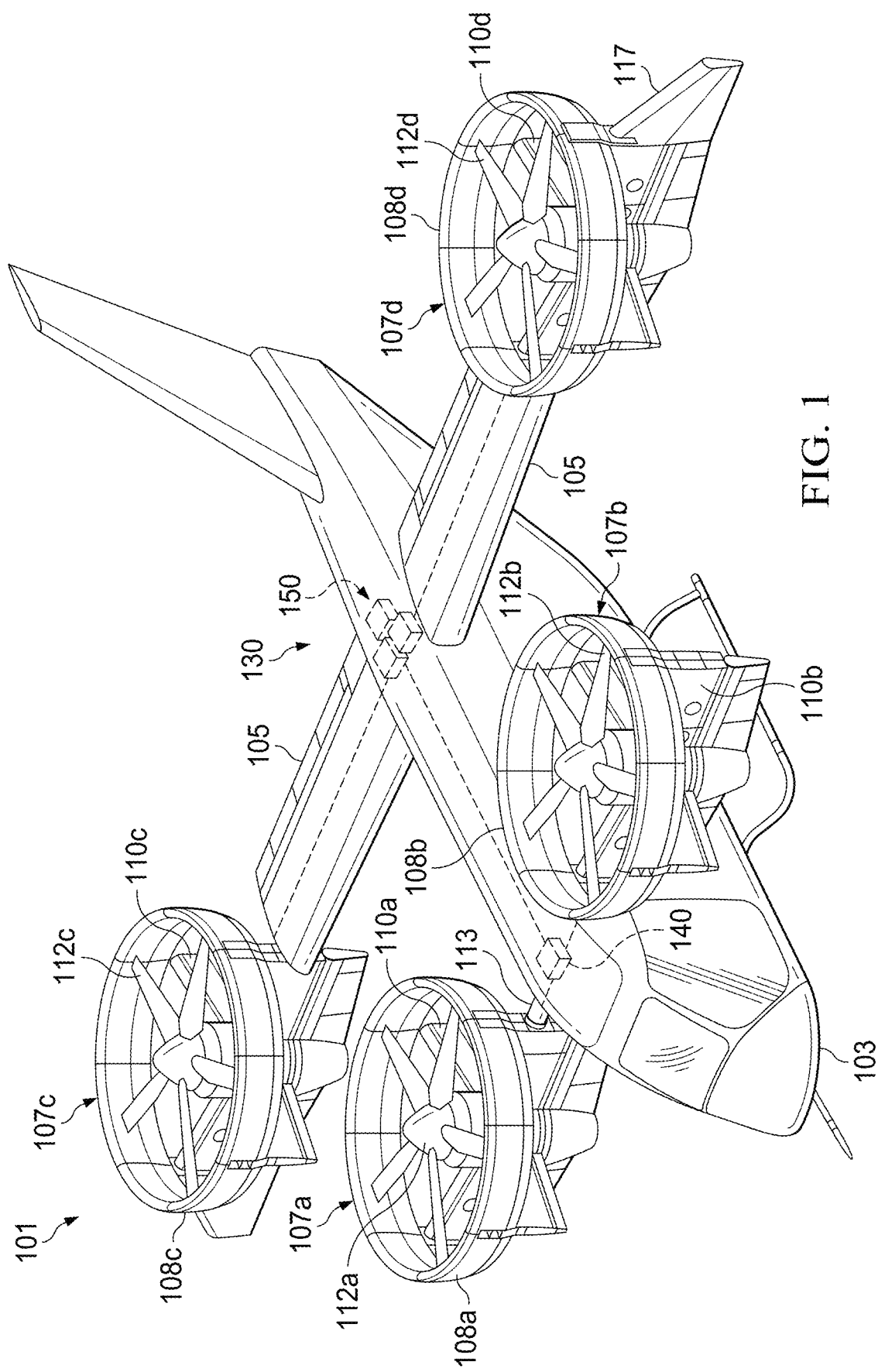
FIG. 1 is a perspective view of an aircraft oriented in a helicopter mode according to aspects of the disclosure.
Figure 2:
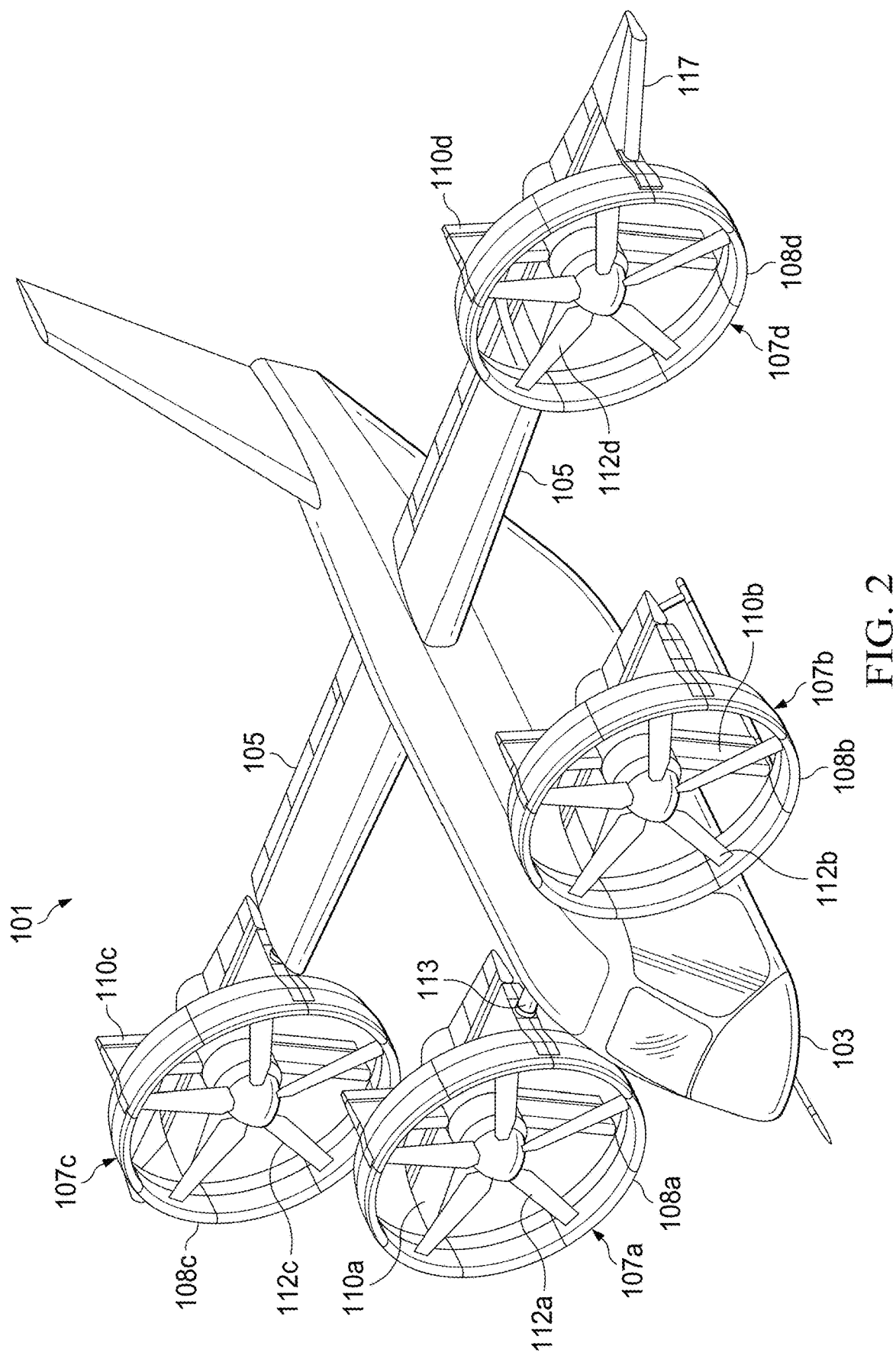
FIG. 2 is a perspective view of an aircraft oriented in an airplane mode according to aspects of the disclosure.

Referring now to FIGS. 1 and 2, perspective views of a rotorcraft 101 operating in helicopter and airplane modes, respectively, are shown according to aspects of the disclosure. Rotorcraft 101 is generally configured as a vertical takeoff and landing (VTOL) aircraft, more specifically a tiltrotor, that is operable in an airplane mode associated with forward flight and a helicopter mode associated with vertical takeoff from and landing to a landing zone. Rotorcraft 101 comprises a fuselage 103 comprising a cockpit and/or passenger compartment, wings 105 extending from the fuselage 103, a pair of ducted fan assemblies 107a, 107b carried by, supported by and/or otherwise coupled to fuselage 103, a pair of ducted fan assemblies 107c, 107d carried by, supported by, and/or otherwise coupled to wings 105. Ducted fan assemblies 107a-107d are arranged about fuselage 103 to be generally coplanar when rotorcraft 101 is in helicopter and airplane modes. In other aspects, ducted fan assemblies 107a, 107b may be offset from ducted fan assemblies 107c, 107d. In some aspects, some or all of ducted fan assemblies 107a-107d may be ductless (e.g., comprising a fan or rotor without a duct).

Each ducted fan assembly 107a, 107b is supported by a rotatable shaft or spindle 113 extending at least partially through fuselage 103 and coupled to the pair of ducted fan assemblies 107a, 107b. The pair of ducted fan assemblies 107a, 107b may be selectively rotated with respect to fuselage 103 by at least one actuator (e.g. electric, electromechanical, magnetic, and/or hydraulic) in order to transition rotorcraft 101 between the airplane mode and the helicopter mode. Each ducted fan assembly 107a-107d comprises a duct 108a-108d, respectively, with each duct 108a-108d having a plurality of structural supports and/or struts 110a-110d. In some aspects, outer surfaces of the ducts 108 may be shaped to provide optimal and/or preferred flight characteristics in at least one of the airplane mode and the helicopter mode.

Ducted fan assemblies 107a, 107b each include a fan 112a, 112b, respectively. It will be appreciated that fans 112a, 112b rotate in opposing directions with respect to one another to balance the torque generated by each fan 112a, 112b. Each fan 112a, 112b includes plurality of rotor blades. Fans 112a, 112b are disposed within their respective duct 108 and are configured to generate thrust when selectively rotated. As illustrated in FIG. 1, each fan 112a, 112b comprises five rotor blades. However, in other aspects, each fan 112a, 112b may comprise two, three, five, six, seven, eight, and/or more rotor blades.

Each wing 105 carries a single ducted fan assembly of the pair of ducted fan assemblies 107c, 107d. The pair of ducted fan assemblies 107c, 107d are supported by a rotatable shaft or spindle (e.g., similar to spindle 113) that extends at least partially through wings 105 and is coupled to the pair of ducted fan assemblies 107c, 107d. The pair of ducted fan assemblies 107c, 107d may be selectively rotated with respect to fuselage 103 by at least one actuator (e.g. electric, electro-mechanical, magnetic, and/or hydraulic) in order to transition rotorcraft 101 between the airplane mode and the helicopter mode. The pair of ducted fan assemblies 107c, 107d are structurally similar to the pair of ducted fan assemblies 107a, 107b and each includes its own duct 108c, 108d, struts 110c, 110d, fans 112c, 112d. Compared to the pair of ducted fan assemblies 107a, 107b, the pair of ducted fan assemblies 107c, 107d are disposed further outboard of fuselage 103. Although ducted fan assemblies 107a-107d are described as including fans 112a-112d, respectively, it will be appreciated that the ducted fan assemblies could include propellers, rotors, and the like.

Rotorcraft 101 is controlled via flight control system 130. Flight control system 130 includes flight control computer 140 that connected to and in communication with propulsion system 150. Propulsion system 150 is controlled by flight control computer 140 and includes components that assist with the flight of rotorcraft 101. Propulsion system 150 may generally include a hybrid electrical system, a hybrid hydraulic system and/or combinations thereof. Flight control computer 140 is configured to selectively control the components of propulsion system 150 to operate rotorcraft 101. Flight control system 130 may include flight control input hardware (e.g. flight controls) configured to receive inputs and/or commands from a pilot to control operation of the rotorcraft 101 and/or a plurality of sensors and/or gauges configured to provide feedback regarding operational characteristics of rotorcraft 101 to the flight control computer 140. Additionally, flight control computer 140 may be configured to selectively control the operation, orientation, rotation, position, and/or rotational speed of the pairs of ducted fan assemblies 107a, 107b and 107c, 107d. In some aspects, flight control system 130 may comprise fly-by-wire architecture for controlling rotorcraft 101. Additionally, in some aspects, flight control system 130 may be capable of optionally-piloted operation. Furthermore, in some aspects, flight control system 130 may comprise collective pitch control for adjusting the pitch of rotor blades 124 and rotational speed control for individually adjusting a rotational speed of rotor systems 122 of each of the ducted fan assemblies 107a-107d, without the need for cyclic control for controlling operation of rotorcraft 101.

Figure 3:
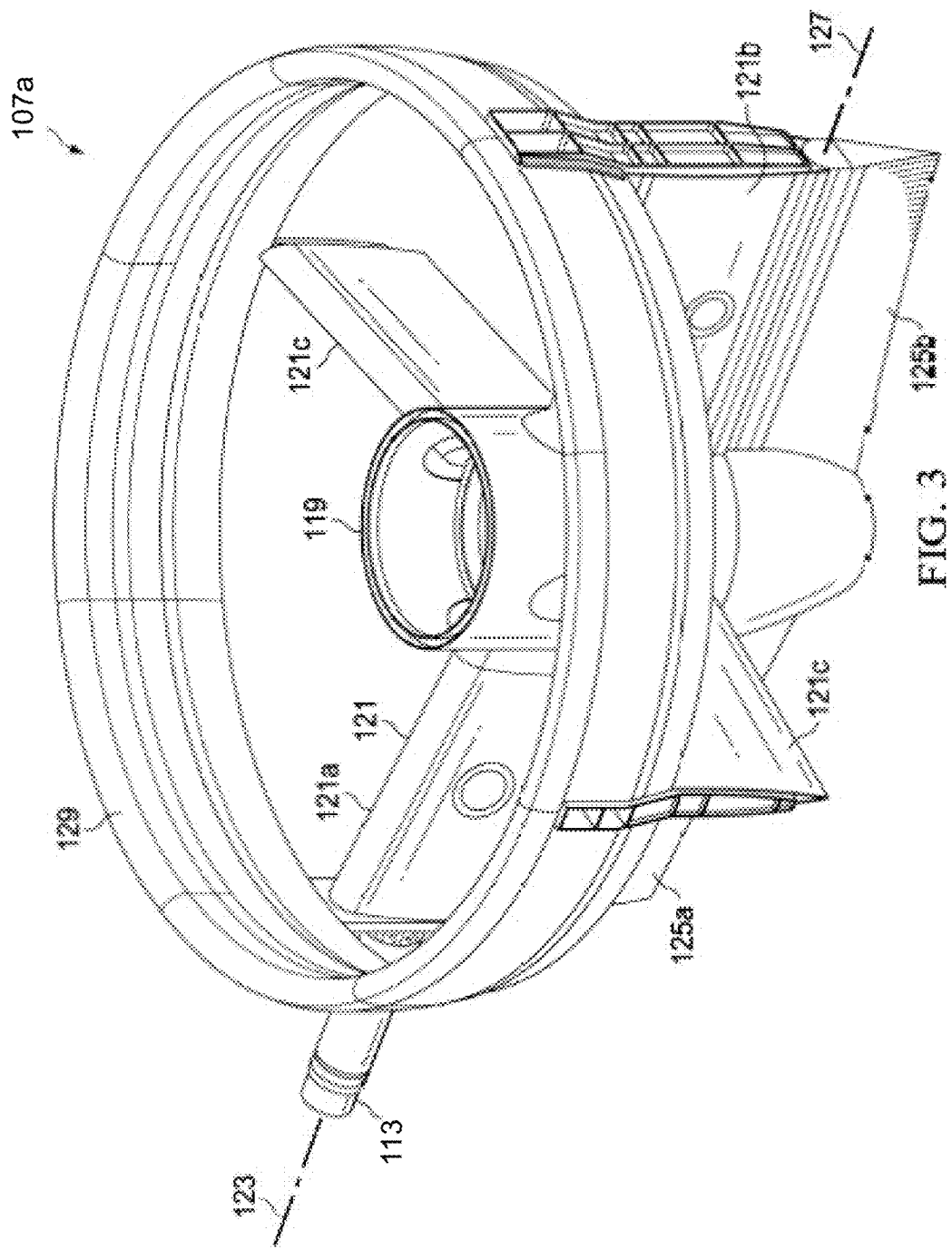
FIG. 3 is a perspective view of a ducted fan assembly according to aspects of the disclosure.

FIG. 3 illustrates ducted fan assembly 107a according to aspects of the disclosure. Ducted fan assembly 107a will be discussed with the understanding that the discussion thereof applies to ducted fan assemblies 107b-107d. Ducted fan assembly 107a is depicted in FIG. 3 without fan 112a and includes a central housing 119 that is configured to support and house components such as a rotor, a gearbox, and/or other components. Ducted fan assembly 107a further includes a plurality of stators 121 that extend outward from housing 119. In this embodiment, ducted fan assembly 107a includes four stators 121 that extend radially outward from housing 119. More specifically, ducted fan assembly 107a has two primary stators that include an inboard primary stator 121a and an outboard primary stator 121b. Inboard primary stator 121a is configured to be coupled to a corresponding spindle, such as spindle 113. Ducted fan assembly 107a is rotatable about a spindle axis 123 that is defined by spindle 113. Ducted fan assembly 107a includes two secondary stators 121c. Primary inboard and outboard stators 121a, 121b respectively are configured to carry a larger proportion of the load of ducted fan assembly 107a back to fuselage 103 than are secondary stators 121c. Inboard primary stator 121a and outboard primary stator 121b are longitudinally aligned relative to each other on opposed sides of housing 119 and secondary stators 121c are longitudinally aligned relative to each other on opposed sides of housing 119 and aligned perpendicularly to inboard primary stator 121a and outboard primary stator 121b. In this regard, stators 121 are equally spaced about housing 119. It should be appreciated that ducted fan assembly 107 may be alternatively configured with more or fewer stators 121. It should further be appreciated that ducted fan assembly 107a may be alternatively configured with different spacing of stators 121 about housing 119.

Ducted fan assembly 107a further includes an inboard control vane 125a and an outboard control vane 125b, which are pivotally attached to inboard primary stator 121a and outboard primary stator 121b, respectively. Inboard control vane 125a and outboard control vane 125b are pivotable about a vane axis 127 that extends parallel to spindle axis 123. In this embodiment, inboard control vane 125a and outboard control vane 125b are configured to rotate together to facilitate yaw control, changes of direction, turning, etc. during flight of rotorcraft 101. It should be appreciated, however, that inboard control vane 125a and outboard control vane 125b may alternatively be configured to rotate independently from one another. It should further be appreciated that ducted fan assembly 107a is not limited to the illustrated configuration of inboard control vane 125a and outboard control vane 125b. For example, ducted fan assembly 107 may alternatively be configured with more or fewer control vanes, such as a single control vane that defines a continuous control surface. Ducted fan assembly 107a may include one or more sections of skin 129 that form an aerodynamic outer covering of ducted fan assembly 107a, and that define an opening that extends through ducted fan assembly 107a. As shown, housing 119 is located primarily aft of the opening.

Figure 4:
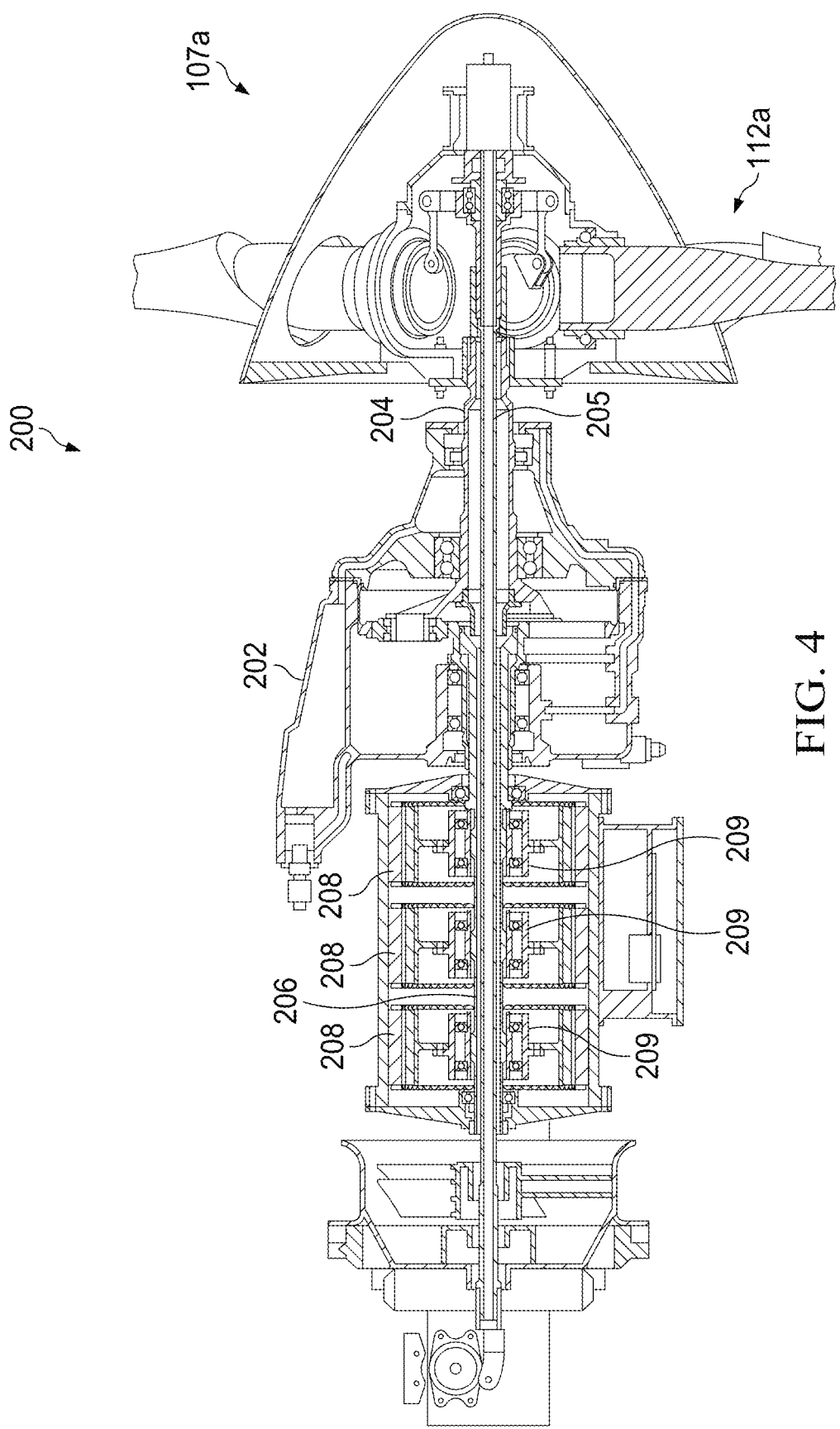
FIG. 4 is a sectioned view of a drivetrain according to aspects of the disclosure.
Figure 5:
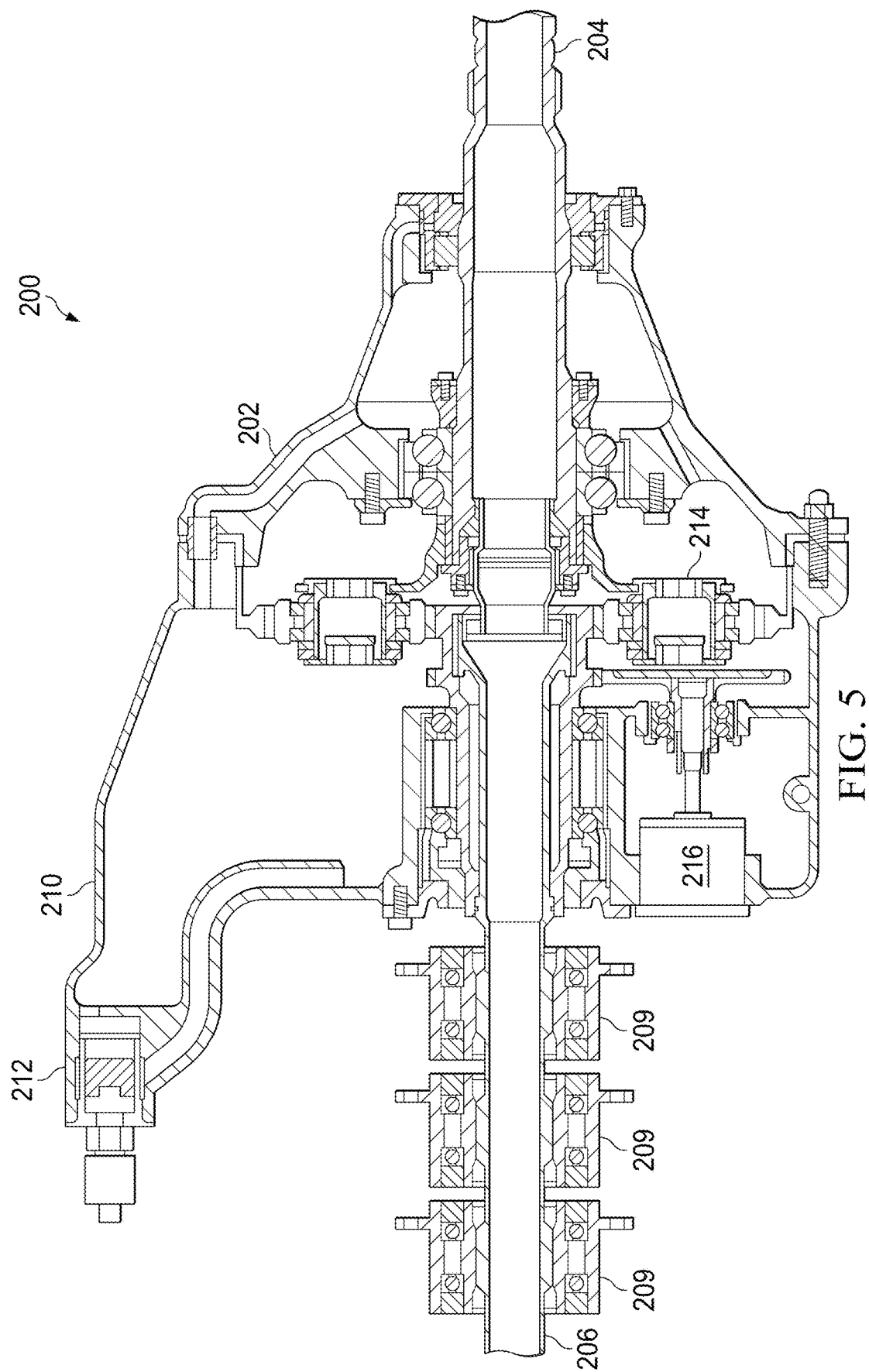
FIG. 5 is a sectioned view of a gearbox according to aspects of the disclosure.

FIGS. 4 and 5 are sectioned views of a ducted fan assembly according to aspects of the disclosure. FIGS. 4 and 5 are discussed relative to ducted fan assembly 107a with the understanding that the discussion thereof applies to ducted fan assemblies 107b-107d. In FIGS. 4 and 5, duct 108a and central housing 119 are hidden from view for illustrative purposes. Ducted fan assembly 107a includes a drivetrain 200 that is housed in central housing 119. Drivetrain 200 includes a gearbox 202, a mast 204, an input shaft 206, and a plurality of electric motors 208. In the aspect illustrated in FIG. 4, drivetrain 200 includes a push/pull tube 205 that extends through mast 204 and input shaft 206. Push/pull tube 205 is coupled to fan 112a such that axial movement of push/pull tube 205 causes a pitch of the blades of fan 112a to change. It will be appreciated by those of skill in the art that mast 204 and input shaft 206 can accommodate other components such as wiring and the like.

Gearbox 202 includes an oil sump 210 with a chip detector/screen 212 positioned therein to remove debris from lubricant that circulates throughout gearbox 202. Gearbox 202 also includes a planetary gear set 214 that is coupled between input shaft 206 and mast 204. In the aspect of FIG. 4, mast 204 is coupled directly to planetary gear set 214. In the aspect of FIG. 5, mast 204 is coupled to planetary gear set 214 via a few intermediary couplers. The aspects of FIGS. 4 and 5 are meant to be illustrative. Planetary gear 214 is used to reduce the speed of input shaft 206 to increase the torque supplied to mast 204. For example, planetary gear set 214 is configured with a gear ratio that reduces the speed of mast 204 relative to input shaft 206 between about 1:3 and 1:5. Fan 112a is secured to mast 204, and the torque supplied to mast 204 rotates fan 112a to generate thrust. Input shaft 206 also drives an oil pump 216 that circulates lubricant (e.g., oil) throughout gearbox 202. An additional benefit to the incorporation of planetary gear set 214 is that input shaft 206 and mast 204 are coaxially aligned, which minimizes the packaging size of drivetrain 200. In other aspects, input shaft 206 and mast 204 may be coupled through an arrangement other than planetary gear set 214. For example, input shaft 206 and mast 204 may be coupled via beveled gears and the like.

Each electric motor 208 of the plurality of electric motors 208 is a relatively small and compact motor that is sometimes referred to as an axial flux, disc, or "pancake" motor. FIG. 4 illustrates three electric motors 208 arranged on input shaft 206. In other aspects, drivetrain 200 may include as few as one electric motor 208, two electric motors 208, or more than three electric motors 208. Including more than one electric motor 208 is beneficial as it provides redundancy for safety. Each electric motor 208 is mounted to input shaft 206 via a sprag clutch 209. A sprag clutch transmits torque when rotated in a first direction and freewheels/overruns and does not transmit torque when rotated in an opposite direction. In other words, each sprag clutch 209 allows its respective electric motor 208 to transmit torque to input shaft 206 when rotating in a first direction or alternatively to operate in an overrun or freewheel mode when rotating in second direction. In some aspects, each sprag clutch 209 is a packed-grease sprag clutch that does not require a lubrication system to circulate a lubricant (e.g., oil or grease) to and from each sprag clutch 209. Packed-grease sprag clutches are sealed units that do not require external lubrication. Using packed-grease style sprag clutches helps reduce the number of components that need to be packaged as a part of drivetrain 200 as no lubrication lines etc. are required to lubricate the sprag clutches. In some aspects, each sprag clutch 209 is fluidly coupled to a lubrication system that provides lubricant (e.g., oil or grease) to each sprag clutch 209.

In some aspects, each electric motor 208 of the plurality of electric motors 208 may simultaneously operate to provide torque to input shaft 206. In the event of a failure of one electric motor 208 of the plurality of electric motors 208, the failed electric motor 208 is allowed to freewheel on input shaft 206 by its sprag clutch 209 while the remaining electric motors 208 continue to provide torque to input shaft 206. In other aspects, only a single electric motor 208 of the plurality of electric motors 208 may be operated to provide torque to input shaft 206 while the remaining electric motors 208 of the plurality of electric motors 208 are permitted to freewheel by their respective sprag clutches 209. In the event of a failure of the first electric motor 208 (or if additional torque is needed), one or both of the remaining electric motors 208 may be operated to provide torque to input shaft 206.

Depending on the aspect, certain acts, events, or functions of any of the algorithms, methods, or processes described herein can be performed in a different sequence, can be added, merged, or left out altogether (e.g., not all described acts or events are necessary for the practice of the algorithms, methods, or processes). Moreover, in certain aspects, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other aspects are possible in which these tasks are performed by a different entity.

Conditional language used herein, such as, among others, "can," "might," "may," "e.g.," and the like, unless specifically stated otherwise, or otherwise understood within the context as used, is generally intended to convey that certain aspects include, while other aspects do not include, certain features, elements and/or states. Thus, such conditional language is not generally intended to imply that features, elements and/or states are in any way required for one or more aspects or that one or more aspects necessarily include logic for deciding, with or without author input or prompting, whether these features, elements and/or states are included or are to be performed in any particular aspect.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed aspect, the terms "substantially," "approximately," "generally," "generally in the range of," and "about" may be substituted with "within [a percentage] of" what is specified, as understood by a person of ordinary skill in the art. For example, within 1%, 2%, 3%, 5%, and 10% of what is specified herein.

While the above detailed description has shown, described, and pointed out novel features as applied to various aspects, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A drivetrain for an aircraft, the drivetrain comprising:
an input shaft;
a first electric motor coupled to the input shaft via a first sprag clutch;
a planetary gear set coupled to the input shaft;
a mast coupled to the planetary gear set, wherein the input shaft and the mast are coaxially aligned;
rotor blades coupled to the mast to rotate with the mast; and
a control tube coupled to the rotor blades and extending inside of the input shaft, the first electric motor, the planetary gear set, and the mast, wherein axial movement of the control tube changes a pitch of the rotor blades.

2. The drivetrain of claim 1, further comprising a second electric motor coupled to the input shaft via a second sprag clutch.

3. The drivetrain of claim 1, wherein the planetary gear set comprises a gear ratio that reduces a rotational speed of the mast relative to the input shaft.

4. The drivetrain of claim 1, wherein the first sprag clutch is a packed-grease sprag clutch.

5. A drivetrain for an aircraft, the drivetrain comprising:
a gearbox having an input shaft and a mast coaxially aligned with the input shaft;

a plurality of electric motors coupled to the input shaft, wherein each electric motor of the plurality of electric motors is coupled to the input shaft via a sprag clutch, rotor blades coupled to the mast to rotate with the mast; and a control tube coupled to the rotor blades and extending inside of the input shaft, the plurality of electric motors, the gearbox, and the mast, wherein axial movement of the control tube changes a pitch of the rotor blades.

6. The drivetrain of claim 5, wherein the input shaft is coupled to the mast via a planetary gear set.

7. The drivetrain of claim 6, wherein the planetary gear set comprises a gear ratio that reduces a rotational speed of the mast relative to the input shaft.

8. The drivetrain of claim 5, wherein each sprag clutch is a packed-grease sprag clutch.

9. A rotorcraft comprising:

a plurality of fan assemblies, each fan assembly of the plurality of fan assemblies comprising a drivetrain, the drivetrain comprising:

a gearbox having an input shaft and a mast coaxially aligned with the input shaft;

a plurality of electric motors coupled to the input shaft, wherein each electric motor of the plurality of electric motors is coupled to the input shaft via a sprag clutch;

rotor blades coupled to the mast to rotate with the mast; and a control tube coupled to the rotor blades and extending inside the input shaft, the first electric motor, the gearbox, and the mast, wherein axial movement of the control tube changes a pitch of the rotor blades.

10. The rotorcraft of claim 9, wherein the input shaft is coupled to the mast via a planetary gear set.

11. The rotorcraft of claim 10, wherein the planetary gear set comprises a gear ratio that reduces a rotational speed of the mast relative to the input shaft.

12. The rotorcraft of claim 9, wherein the sprag clutches are packed-grease sprag clutches.

13. The rotorcraft of claim 9, wherein one or more of the plurality of fan assemblies are ducted fan assemblies.

14. The rotorcraft of claim 9, wherein the rotorcraft is a tiltrotor aircraft and the plurality fan assemblies rotate between an airplane mode and a helicopter mode.

15. The rotorcraft of claim 9, wherein the plurality of electric motors are axial flux motors.

16. The rotorcraft of claim 9, wherein the each fan assembly is a ducted fan comprising:

a duct surrounding the rotor blades;

a housing centrally located with the duct, wherein the housing contains the plurality of electric motors.

17. The rotorcraft of claim 16, wherein the plurality of electric motors are axial flux motors.

18. The rotorcraft of claim 16, wherein the drive train does not comprise an engine.

19. The rotorcraft of claim 16, wherein the ducted fan is mounted on a spindle and is rotatable relative to a fuselage of the rotorcraft between an airplane mode and a helicopter mode.

20. The rotorcraft of claim 19, wherein the plurality of electric motors are axial flux motors.

* * * * *